June 1, 1926.
W. J. GARNER
1,586,668
LEAK STOPPING DEVICE
Filed July 7, 1925
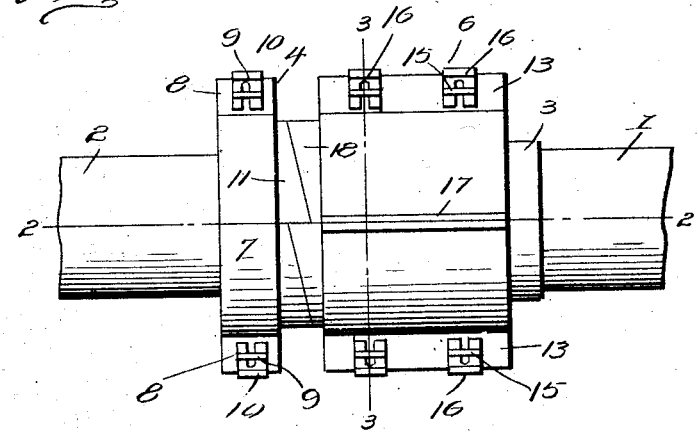
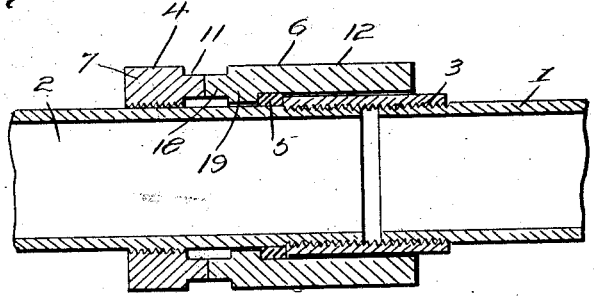
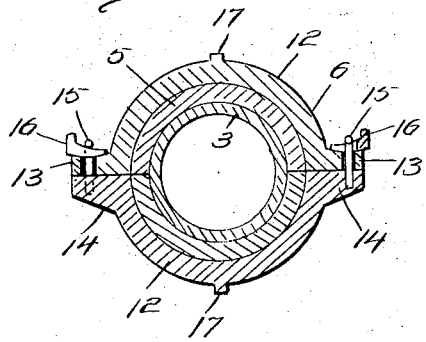 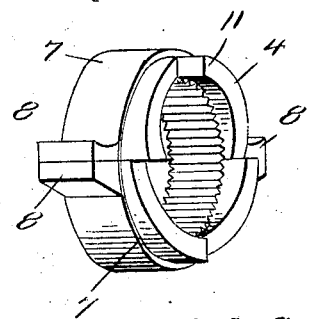
Inventor
W. J. Garner Patented June 1, 1926.

1,586,668

UNITED STATES PATENT OFFICE.

WALTER JAMES GARNER, OF PETROLIA, TEXAS.

LEAK-STOPPING DEVICE.

Application filed July 7, 1925. Serial No. 42,064.

This invention relates to a device devised particularly for stopping a leak in a pipe such as is likely to occur more particularly where the ends of two pipe sections are coupled together.

Briefly, the invention is featured by the presence of a removable abutment placed on one section of the pipe adjacent the leaky end of the coupling, a gasket placed against the end of the coupling to stop the leak, and a means interposed between the gasket and the abutment, and capable of compressing the gasket tightly against the end of the coupling to stop further leakage.

The object is to provide a simple and inexpensive device of this class which is easy to place in position for use, and one that does not require the presence of bolts, nuts, and the like to hold it in position on the pipe.

Other features and advantages of the invention will become apparent from the following description and drawing.

In the accompanying drawing forming a part of this application and in which like numerals are employed to designate like parts throughout the same:

Figure 1 is a side view of a portion of a pipe showing two sections coupled together and indicating the position of the leak stopping device thereon.

Figure 2 is a central longitudinal section taken approximately on the plane of the line 2—2 of Figure 1.

Figure 3 is a cross section taken on the line 3—3 of Figure 1.

Figure 4 is a perspective view of the so called abutment.

Referring to the drawings in detail, the reference character 1 designates one section of the pipe, 2 the other section, and 3 the usual coupling or column which is threadedly connected to the adjacent end. As stated, it is quite frequent for a leak to occur in the pipe particularly at the joint. I am aware that numerous devices have been devised for use at this point for stopping leaks of this kind, but so far as I have been able to ascertain, all of these devices are accompanied by objectionable parts. I therefore propose to provide a boltless device which may be easily applied so that packing may be clamped against either end of the coupling to stop a leak.

The improved device comprises essentially what will hereinafter be referred to as an abutment 4, together with a gasket 5 and compressing means 6 for this gasket.

Considering first the abutment it will be seen that this comprises a pair of semi-circular half sections 7, the adjacent ends of which are provided with outstanding ears 8, the lower ones of which are provided with U-shaped keepers 9 extending upwardly through slots in the upper ears. Removable lugs or wedges 10 cooperate with the keepers and upper ears to clamp the two pairs of ears together and maintain the half sections in clamped position upon the section 2 of the pipe. It will be noted that the inner faces of these sections are provided with teeth whereby an anti-slipping grip is had. Both of these half sections are provided with tapered extensions 11 forming cams. Th packing compressing device may also be referred to as a sleeve, the same being made up of two halves 12 of substantially duplicate design. The abutting edges of these halves are equipped with outstanding flanges 13 and 14. The flanges 14 on the lower sections carrying U-shaped keepers 15 extending upwardly through slots in the flanges 13. Removable wedges 16 are also employed in association with these keepers. Each half of the sleeve is provided with a central longitudinal rib 17 adapted to be gripped by a spanner wrench or the like whereby the sleeve may be bodily rotated with respect to the relatively stationary abutment. The sleeve is provided on the end adjacent the cams 11 with cooperating cams 18. Moreover, the sleeve is formed with an internal annular rib 19 adapted to bear against and compress the packing or gasket 5.

In use, the abutment 4 is clamped upon the pipe at an appropriate distance from the coupling, after which the compressible packing ring (of split form) is placed against the meeting end of the coupling. Then the rotary sleeve is placed in position to surround the coupling and to bring the shoulder 19 against the packing with the cams 18 against the cams 11. Obviously, the cam action produced by the cooperating cam serves to bodily provide the sleeve against the packing and to compress it against the coupling to stop the leak.

A careful consideration of the description in connection with the drawings will enable persons familiar with devices of this kind will obtain a clear understanding of the invention, for this reason a more lengthy description is thought unnecessary.

Although the preferred embodiment of the invention has been shown and described, it is to be understood that minor changes coming within the field of invention may be resorted to if desired.

Having thus described the invention, what I claim as new and desire to secure by Letters Patent is:—

1. In combination, a pipe embodying a pair of sections, and a coupling connecting said sections together, a compressible gasket placed against one end of the coupling, an abutment on one section of the pipe adjacent the gasket and spaced therefrom, relatively rotatable means interposed between the gasket and abutment, and cam coacting means between the rotatable means and abutment, whereby the gasket will be compressed when said means is rotated.

2. A leak stopping device for pipe joints comprising an abutment adapted to be fixedly mounted on one section of a pipe adjacent a leaking joint, said abutment embodying cams, a sleeve adapted to encircle a coupling member of the joint, said sleeve being provided with a shoulder adapted to engage a gasket which is placed against one end of said member, and coacting cams on the sleeve cooperable with the first named cam.

3. As a new article of manufacture, a gasket compressing member for use in association with a leak stopping device of the kind described, comprising a sleeve made up of two halves adapted to surround a pipe joint coupling, said sleeve being provided with an internal annular rib to engage and compress a gasket against one end of said coupling, and a plurality of cams on one end of the sleeve.

In testimony whereof I affix my signature.

WALTER JAMES GARNER.